United States Patent
Inagaki et al.

(10) Patent No.: US 8,722,251 B2
(45) Date of Patent: May 13, 2014

(54) ACTIVE MATERIAL, NONAQUEOUS ELECTROLYTE BATTERY AND BATTERY PACK

(75) Inventors: Hiroki Inagaki, Yokohama (JP); Yasuhiro Harada, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 134 days.

(21) Appl. No.: 13/537,718

(22) Filed: Jun. 29, 2012

(65) Prior Publication Data

US 2013/0065101 A1    Mar. 14, 2013

(30) Foreign Application Priority Data

Sep. 14, 2011  (JP) ................. 2011-200873

(51) Int. Cl.
*H01M 4/13*   (2010.01)
*H01M 4/88*   (2006.01)

(52) U.S. Cl.
USPC ............... 429/231.5; 429/218.1; 252/182.1

(58) Field of Classification Search
None
See application file for complete search history.

(56) References Cited

U.S. PATENT DOCUMENTS

| | | |
|---|---|---|
| 2012/0009449 A1 | 1/2012 | Inagaki et al. |
| 2012/0129016 A1 | 5/2012 | Inagaki et al. |

FOREIGN PATENT DOCUMENTS

| | | |
|---|---|---|
| JP | 2002-184400 | 6/2002 |
| JP | 2008-124012 | 5/2008 |

OTHER PUBLICATIONS

Rene Marchand, et al., "TiO$_2$(B) a New Form of Titanium Dioxide and the Potassium Octatitanate K$_2$Ti$_8$O$_{17}$", Material Research Bulletin, vol. 15, 1980, pp. 1129-1133.

*Primary Examiner* — Cynthia K. Walls
(74) *Attorney, Agent, or Firm* — Oblon, Spivak, McClelland, Maier & Neustadt, L.L.P.

(57) ABSTRACT

According to one embodiment, an active material includes a monoclinic system β-type titanium composite oxide. The monoclinic system β-type titanium composite oxide includes a first element including at least one of Mo and W and satisfies the following formula (1):

$$B>A \qquad (1)$$

In the formula, A is an intensity of a peak which is derived from (110) plane of the monoclinic system β-type titanium composite oxide in a wide-angle X-ray diffraction pattern. B is an intensity of a peak which is derived from (002) plane of the monoclinic system β-type titanium composite oxide in the wide-angle X-ray diffraction pattern.

13 Claims, 6 Drawing Sheets

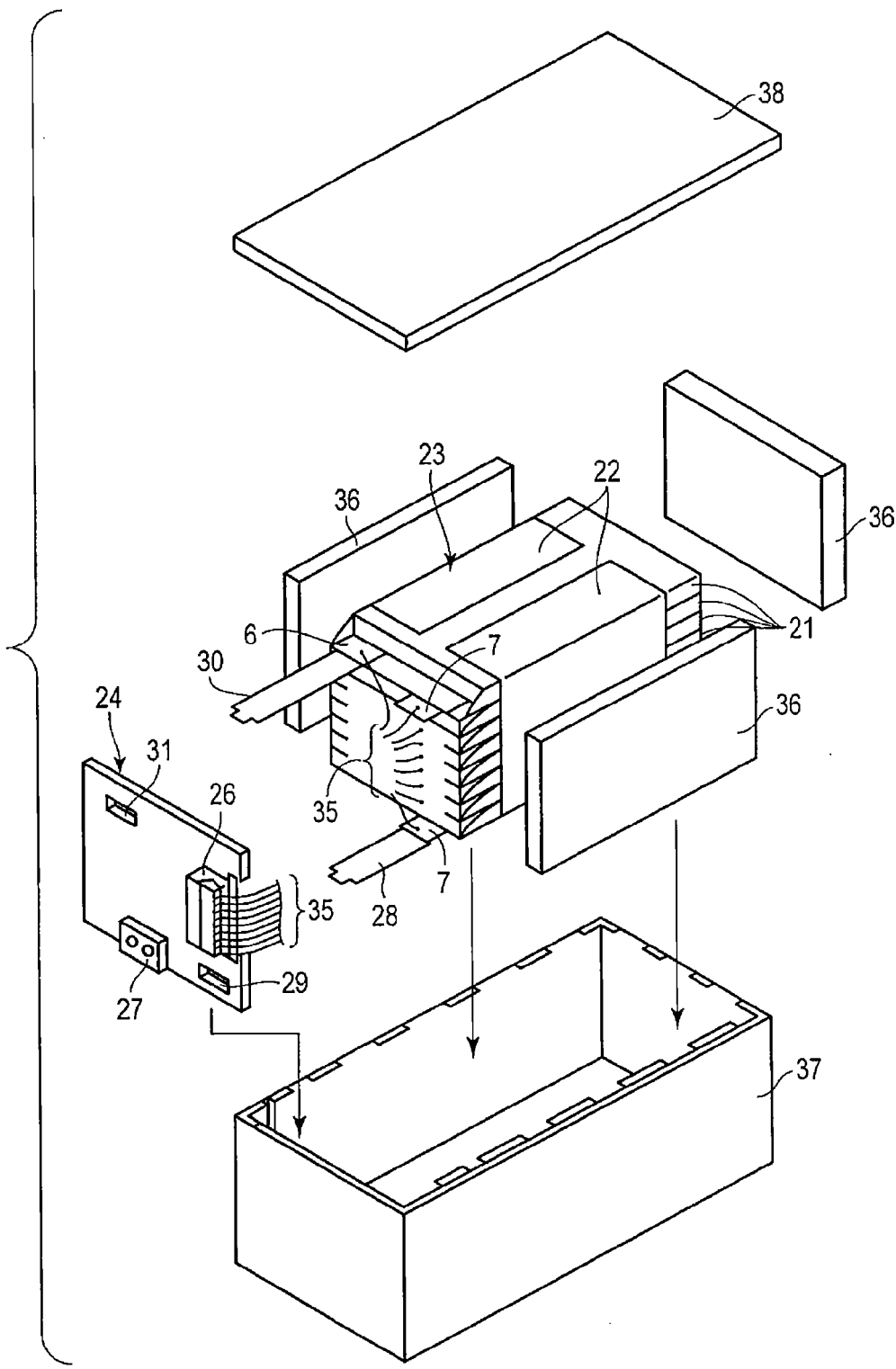
F I G. 4

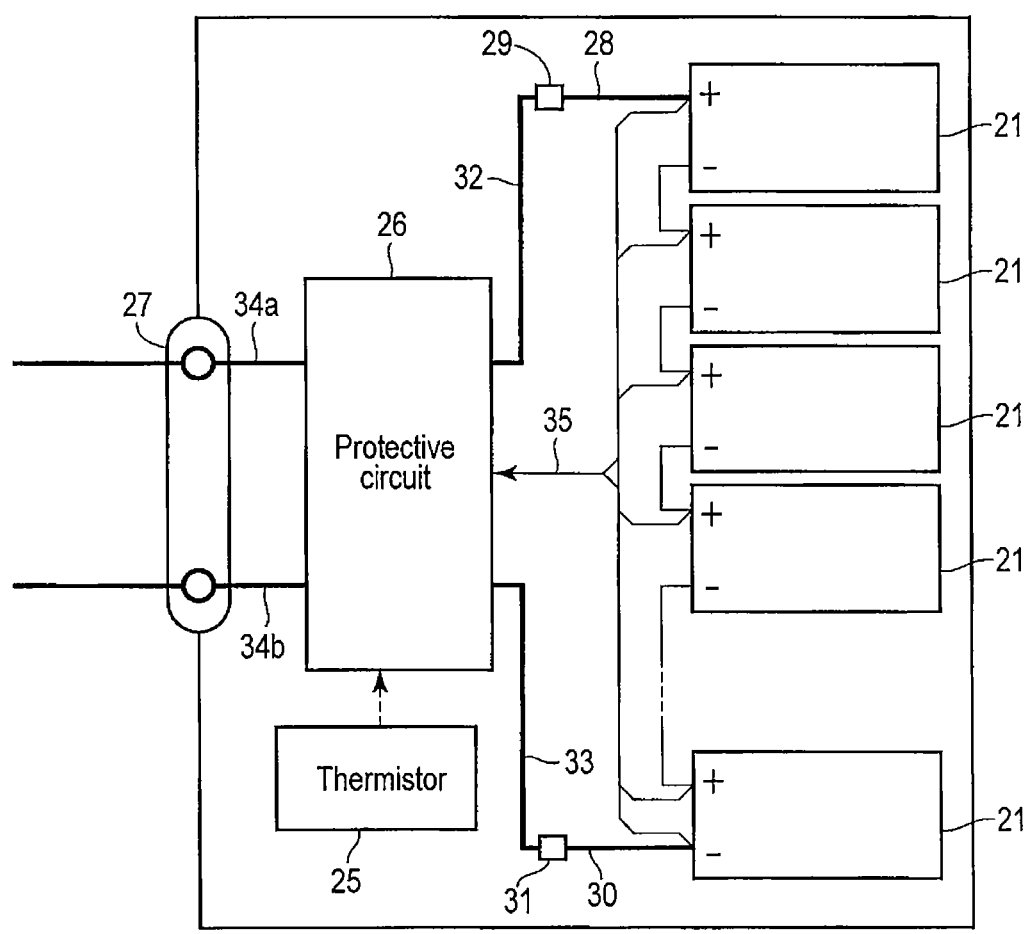
F I G. 5

US 8,722,251 B2

ACTIVE MATERIAL, NONAQUEOUS ELECTROLYTE BATTERY AND BATTERY PACK

CROSS-REFERENCE TO RELATED APPLICATIONS

This application is based upon and claims the benefit of priority from Japanese Patent Application No. 2011-200873, filed Sep. 14, 2011, the entire contents of which are incorporated herein by reference.

FIELD

Embodiments described herein relate generally to an active material for a battery, a nonaqueous electrolyte battery, and a battery pack.

BACKGROUND

In recent years, a titanium oxide having a monoclinic system β-type structure has attracted attention as an active material for a nonaqueous electrolyte battery. A spinel-type lithium titanate that is practically used ($Li_4Ti_5O_{12}$) has three lithium ions that can be absorbed and released per a unit chemical formula. Therefore, the number of lithium ions that can be absorbed into and released from one titanium ion was 3/5, and 0.6 was theoretically the maximum value. On the other hand, in a titanium oxide having a monoclinic system β-type structure, the maximum number of lithium ions that can be absorbed into or released from one titanium ion is 1.0. Therefore, it has a high theoretical capacity of about 335 mAh/g.

Meanwhile, with respect to the particle shape of the titanium oxide having a monoclinic system β-type structure, since $K_2Ti_4O_9$ or the like that is used as a synthesis precursor readily grows to a shape of fibrous particles, the titanium oxide having a monoclinic system β-type structure also readily grows to a fibrous shape which reflects the synthesis precursor shape. Therefore, a nonaqueous electrolyte battery comprising a negative electrode comprising a titanium oxide having a monoclinic system β-type structure has insufficient charge and discharge cycle performances.

BRIEF DESCRIPTION OF THE DRAWINGS

FIG. 4 is an exploded perspective view showing the battery pack according to the third embodiment;

FIG. 5 is a block diagram of the battery pack of FIG. 4;

DETAILED DESCRIPTION

According to one embodiment, an active material including a monoclinic system β-type titanium composite oxide is provided. The monoclinic system β-type titanium composite oxide includes a first element including at least one of Mo and W and satisfies the following formula (1):

$$B > A \tag{1}$$

In the formula, A is the intensity of a peak that is derived from the (110) plane of the monoclinic system β-type titanium composite oxide in a wide-angle X-ray diffraction pattern of the monoclinic system β-type titanium composite oxide. B is the intensity of a peak that is derived from the (002) plane of the monoclinic system β-type titanium composite oxide in this wide-angle X-ray diffraction pattern.

Furthermore, according to one embodiment, a nonaqueous electrolyte battery including a positive electrode, a negative electrode including the active material according to the embodiment and a nonaqueous electrolyte is provided.

Furthermore, according to one embodiment, a battery pack including the nonaqueous electrolyte battery including the active material according to the embodiment is provided.

The embodiments will be hereinafter explained with reference to drawings.

First Embodiment

The monoclinic system β-type titanium composite oxide is an oxide having a crystal structure represented by $TiO_2(B)$ and comprising an element other than Ti (for example, the first element). The crystal structure represented by $TiO_2(B)$ mainly belongs to a space group C2/m, and has a tunnel structure as exemplified in FIG. 1. The detailed crystal structure of $TiO_2(B)$ is described in, for example, R. Marchand, L. Brohan, M. Tournoux, Material Research Bulletin 15, 1129 (1980).

Figure 1:
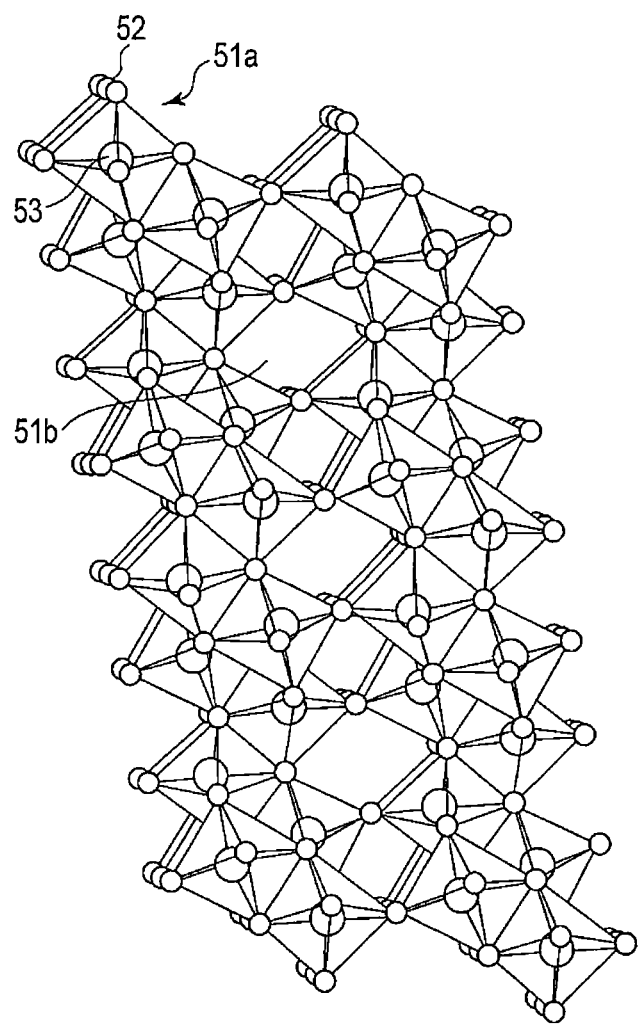
FIG. 1 is a schematic view showing the crystal structure represented by $TiO_2(B)$ of the monoclinic system β-type titanium composite oxide.

As shown in FIG. 1, the crystal structure represented by $TiO_2(B)$ has a structure in which titanium ions 53 and oxide ions 52 constitute backbone structure parts 51a, and the backbone structure parts 51a and void parts 51b are disposed in a regular manner. These void parts 51b can be host sites for absorption and release of heterologous atomic species. It is said that host sites that can absorb and release heterologous atomic species are also present on the crystal surface of $TiO_2(B)$. By absorbing or releasing of lithium ions on these host sites, $TiO_2(B)$ can absorb and release lithium ions reversibly.

When lithium ions are absorbed into the void parts 51b, $Ti^{4+}$ that constitutes the backbone is reduced to $Ti^{3+}$, thereby the electrical neutrality of the crystal is retained. Since $TiO_2(B)$ has one $Ti^{4+}$ per a chemical formula, it is theoretically possible to insert one lithium ion at the maximum between layers. Therefore, the monoclinic system β-type titanium composite oxide having a crystal structure represented by $TiO_2(B)$ comprises lithium as a constitutional element after absorption or release of lithium ions in some cases, or does not comprise in some cases. Furthermore, the monoclinic system β-type titanium composite oxide having such crystal structure can obtain a capacity of 335 mAh/g or more.

The monoclinic system β-type titanium composite oxide comprises a first element comprising at least one of Mo and W. Incorporation of the first element contributes to improvement of the life performance since the crystallinity is increased due to increase in the crystallite size of the oxide, and the like. It is desirable that the first element forms a solid solution with Ti in the monoclinic system β-type titanium composite oxide. It is preferable that the content of the first element is in the range of 0.01% by mass or more and 3% by mass or less. By adjusting the content of the first element to 0.01% by mass or more, a sufficient life improving effect can be obtained. Furthermore, incorporation of an impurity phase can be decreased and a single phase is readily obtained by adjusting the content of the first element to 3% by mass or less, and thus an electrode capacity (specifically an initial capacity) and a capacity retention during charge and discharge cycles can be improved. A more preferable range is 0.1% by mass or more and 1% by mass or less.

The monoclinic system β-type titanium composite oxide satisfies the formula (1). In the wide-angle X-ray diffraction pattern, a peak that is derived from the (110) plane of the monoclinic system β-type titanium composite oxide appears in the vicinity of 23.5 to 25.5°. Furthermore, in the wide-angle X-ray diffraction pattern, a peak that is derived from the (002) plane of the monoclinic system β-type titanium composite oxide appears in the vicinity of 27.5 to 29.5°. In the case when the active material is extracted from an assembled battery and measured, it can be extracted, for example, by the following method. A battery is disintegrated in a discharging state, an electrode (for example, a negative electrode) is removed, and the active material-containing layer thereof is deactivated in water by immersing in water. The immersing treatment is conducted until generation of hydrogen gas is not observed, and is generally conducted for 10 minutes to 1 hour. Thereafter the monoclinic system β-type titanium composite oxide in the active material-containing layer is extracted. In the extraction treatment, for example, in the case when polyvinylidene fluoride is used as a binder, the binder component is removed by washing with N-methyl-2-pyrrolidone or the like, and a conductant agent is removed by using a mesh having a suitable opening. In the case when these components remain slightly, they may be removed by a heat treatment in the air (for example, at 250° C. for 30 minutes, or the like).

In the case when B≤A, i.e., in the case when the peak intensity A is equal to the peak intensity B or the peak intensity A is larger than the peak intensity B, the monoclinic system β-type titanium composite oxide has a low degree of orientation of crystals along the (002) plane. Therefore, even the crystallinity is increased by adding the first element, an agglomerated particle of fibrous particles which is difficult to be disintegrated cannot be obtained. Therefore, disintegration of the agglomerated particle proceeds by change in the volume of the active material in accordance with charging and discharging, and thus the current-collecting network between the fibrous particles is disrupted earlier and the life performance is decreased. In the case when B>A, i.e., when the peak intensity A is smaller than the peak intensity B, the monoclinic system β-type titanium composite oxide has a high degree of orientation of crystals along the (002) plane. Therefore, an agglomerated particle of fibrous particles which is difficult to be disintegrated can be obtained by increasing the crystallinity by adding the first element. Therefore, since disintegration of the agglomerated particle due to change in the volume of the active material in accordance with charging and discharging can be suppressed, the life performance of the battery can be improved.

It is preferable that the monoclinic system β-type titanium composite oxide comprises a second element comprising at least one selected from the group consisting of V, Nb and Ta. Since the fiber length of primary particles is shorten by adding the second element, the large-current performances of the battery can be improved. Furthermore, since the fiber length of the primary particles is shorten, the active material is readily formed into secondary particles, and thus secondary particles having a high strength can be obtained. Since secondary particles having a high strength are difficult to be disintegrated in a step of preparing a slurry, a step of applying the slurry to a current collector and a step of pressing in the production of an electrode, the current-collecting network between the primary particles is difficult to be broken. Furthermore, the secondary particles are also difficult to be disintegrated against the change in the volume of the active material in accordance with charging and discharging. As the results thereof, the life performance of the battery can be improved. Among the second elements, Nb is the most preferable. Furthermore, it is desirable that the second element forms a solid solution with Ti in the monoclinic system β-type titanium composite oxide.

It is preferable that the content of the second element in the monoclinic system β-type titanium composite oxide is in the range of 0.01% by mass or more and 10% by mass or less. Primary particles having a short fiber length are readily obtained by adjusting the content of the second element to 0.01% by mass or more. Furthermore, incorporation of an impurity phase can be decreased and a single phase is readily obtained by adjusting the content of the second element to 10% by mass or less, and thus an electrode capacity (specifically an initial capacity) and a capacity retention during charge and discharge cycles can be improved.

It is desirable that the monoclinic system β-type titanium composite oxide has an agglomerated particle of fibrous particles (secondary particles) comprising the first element by a content of 0.01% by mass or more and 3% by mass or less and the second element by a content of 0.01% by mass or more and 10% by mass or less. Therefore, since disintegration of the agglomerated particle due to progression of charge and discharge cycles can further be decreased, a more excellent life performance can be obtained. It is desirable that the fibrous particles have an average fiber diameter of 1 nm or more and 10 μm or less and a ratio of fiber length to fiber diameter represented by the following formula (2) of 20 or less.

$$X=L/D \qquad (2)$$

In the formula, X is a ratio of fiber length to fiber diameter, L is a fiber length, and D is a fiber diameter.

For the average fiber diameter, an average value of the fiber diameters of ten primary particles that are randomly extracted by SEM observation is used. Furthermore, ratios X of fiber length to fiber diameter are calculated for the ten primary particles that are randomly extracted by SEM observation, and the average value thereof is defined as the ratio X of fiber length to fiber diameter.

It is preferable that the monoclinic system β-type titanium composite oxide has a specific surface area of 5 m$^2$/g or more and 50 m$^2$/g or less. In the case when the specific surface area is 5 m$^2$/g or more, it becomes possible to sufficiently ensure sites for absorption and release of lithium ions. In the case when the specific surface area is 50 m$^2$/g or less, handling becomes easy in industrial production.

The contents of the first element and second element can be measured by using an ICP (inductively coupled plasma) spectrometry method. The measurement of the element contents by the ICP spectrometry method can be conducted by, for example, the following method. A battery is disintegrated in a discharging state, an electrode (for example, a negative electrode) is removed, and the active material-containing layer thereof is deactivated in water by immersing in water. The immersing treatment is conducted until generation of hydrogen gas is not observed, and is generally conducted for 10 minutes to 1 hour. Thereafter the monoclinic system β-type titanium composite oxide in the active material-containing layer is extracted. In the extraction treatment, for example, in the case when polyvinylidene fluoride is used as a binder, the binder component is removed by washing with N-methyl-2-pyrrolidone or the like, and a conductant agent is removed by using a mesh having a suitable opening. In the case when these components remain slightly, they may be removed by a heat treatment in the air (for example, at 250° C. for 30 minutes, or the like). The extracted titanium composite oxide is measured and put into a case, and subjected to acid dissolution or alkali dissolution to obtain a measurement solution. This measurement solution is subjected to an ICP spectrometry by a measurement device (for example, SPS-1500V manufactured by SII Nano Technology Inc.) to measure the contents of the first element and second element.

Next, the method for the production of the active material for a battery according to the embodiment will be explained.

Firstly, for example, an anatase-type $TiO_2$ as a Ti source, $K_2O$ or $K_2CO_3$ as a K source, $K_2MoO_4$ as a Mo source and $K_2WO_4$ as a W source are used for starting raw materials. The starting raw materials are mixed at a predetermined ratio depending on an intended alkali titanate compound, formed into agglomerated particles of fibrous primary particles by spray drying or the like, and subjected to a heat treatment, thereby an alkali titanate compound can be obtained. At this time, since $K_2MoO_4$ and $K_2WO_4$ function as fluxes, an active material having higher crystallinity can be obtained (so-called a flux method). The temperature for the heat treatment is preferably from 900 to 1,200° C. This is because the temperature at which $K_2MoO_4$ and $K_2WO_4$ are molten is about 900° C. A more preferable temperature at which fibers having high crystallinity can be obtained is from 1,000 to 1,150° C. In the case of synthesis by a flux method, since the fiber length tends to be long, it is preferable to use the second element.

The alkali titanate compound is sufficiently washed with pure water to remove impurities from the alkali titanate compound, and subjected to an acid treatment to exchange alkali cations for protons. The potassium ion in potassium titanate can be exchanged for a proton without deteriorating the crystal structure. Proton exchanging by an acid treatment is conducted, for example, by adding hydrochloric acid having a concentration of 1 M to starting raw materials and stirring. It is desirable that the acid treatment is conducted until proton exchanging is completed sufficiently. During the proton exchanging, the pH may be adjusted by adding an alkaline solution to the solution. After the proton exchanging is completed, the product is washed again with pure water.

The product for which proton exchanging has been completed is washed with water and dried to give a proton-exchanged form as an intermediate product. The proton-exchanged form is then heat-treated to produce the monoclinic system β-type titanium composite oxide that contains the first element and satisfies the formula (1).

A preferable heating temperature is the range of from 300 to 500° C. When the heating temperature is less than 300° C., the crystallinity is decreased significantly, and the electrode capacity, charge-discharge efficiency and cycle property are decreased. On the other hand, when the heating temperature exceeds 500° C., it is likely that the capacity is decreased since an impurity phase such as an anatase phase or a rutile phase is generated. A more preferable heating temperature is the range of from 350 to 400° C.

Furthermore, in addition to the monoclinic system β-type titanium composite oxide, other active material such as a spinel-type lithium titanate ($Li_4Ti_5O_{12}$) can be used for the active material for a battery.

The active material for a battery according to the embodiment can be used for not only a negative electrode but also for a positive electrode, and an excellent cycle life performance can be obtained when applied to either electrode. Namely, the excellent cycle life performance is an effect obtained by increasing the powder strength, and the effect is not changed when the active material is used for either a negative electrode or a positive electrode. Therefore, the active material for a battery according to the embodiment can be used for either a positive electrode or a negative electrode, and a similar effect can be obtained.

In the case when the active material for a battery according to the embodiment is used for a positive electrode, metal lithium, a lithium alloy, or a carbon-based material such as graphite and coke can be used for the active material of a negative electrode.

According to the first embodiment, since the monoclinic system β-type titanium composite oxide that comprises a first element comprising at least one of Mo and W and satisfies the formula (1) is used, disintegration of the active material can be suppressed and the life performance can be improved. Furthermore, since the monoclinic system β-type titanium composite oxide has high crystallinity, it provides excellent diffusivity of lithium ions, and is also excellent in initial volume and large-current performances.

Second Embodiment

According to the second embodiment, a nonaqueous electrolyte battery comprising a case, a positive electrode that is provided in the case, a negative electrode that is provided in the case, and a nonaqueous electrolyte that is provided in the case is provided. The negative electrode comprises the active material according to the first embodiment. Furthermore, the negative electrode is spatially displaced from the positive electrode. In order to spatially separate the negative electrode from the positive electrode, for example, a separator can be disposed between the positive electrode and negative electrode.

Hereinafter the case, negative electrode, positive electrode, separator and nonaqueous electrolyte will be explained in detail.

1) Case

The case is formed from a laminate film having a thickness of 0.5 mm or less. Alternatively, a metal case having a wall thickness of 1.0 mm or less is used for the case. It is more preferable that the metal case has a wall thickness of 0.5 mm or less.

Examples of the form of the case may include a flat type (thin type), a rectangular type, a cylindrical type, a coin type, a button type and the like. Examples of the case may include cases for small batteries that are loaded on portable electronic devices and the like, cases for large batteries that are loaded on two- or four-wheel automobiles and the like, depending on the size of the battery.

As the laminate film, a multilayer film comprising resin layers and a metal layer that is interposed therebetween is used. The metal layer is preferably an aluminum foil or aluminum alloy foil for weight saving. For the resin layer, for example, polymer materials such as polypropylene (PP), polyethylene (PE), nylon or polyethylene telephthalate (PET) can be used. The laminate film can be formed into a shape of the case by heat sealing.

The metal case is made of aluminum, an aluminum alloy or the like. As the aluminum alloy, alloys comprising an element such as magnesium, zinc and silicon are preferable. In the case when the alloy comprises a transition metal such as iron, copper, nickel and chromium, the amount thereof is preferably 100 ppm by mass or less.

2) Negative Electrode

The negative electrode comprises a current collector, and negative electrode active material-containing layer(s) comprising an active material, a conductive agent and a binder (negative electrode material layer[s]) which is/are formed on one surface or both surfaces of the current collector. For the active material, the active material according to first embodiment is used.

The conductive agent improves the current collecting performance of the active material and suppress the contact resistance with the current collector. Examples of the conductive agent include acetylene black, carbon black and graphite.

The binder can bind the active material and the conductive agent. Examples of the binder include polytetrafluoroethylene (PTFE), polyvinylidene fluoride (PVdF), fluorine-based rubbers and styrene-butadiene rubbers.

It is preferable to mix the active material, conductive agent and binder in the negative electrode active material-containing layer by the ratios of 70% by mass or more and 96% by mass or less, 2% by mass or more and 28% by mass or less, and 2% by mass or more and 28% by mass or less, respectively. By adjusting the amount of conductive agent to 2% by mass or more, an excellent current collecting performance can be imparted to the negative electrode active material-containing layer. Furthermore, by adjusting the amount of binder to 2% by mass or more, the binding property between the negative electrode active material-containing layer and current collector can be increased. On the other hand, it is preferable to adjust the conductive agent and binder to 28% by mass or less, respectively, in view of increasing of the capacity.

The current collector is preferably an aluminum foil or an aluminum alloy foil comprising an element such as Mg, Ti, Zn, Mn, Fe, Cu and Si which is electrochemically stable at a potential range nobler than 1.0 V.

The negative electrode is prepared by, for example, suspending the active material, conductive agent and binder in a solvent to prepare a slurry, applying the slurry to the current collector and drying, and pressing the current collector. Alternatively, the negative electrode may be prepared by forming the active material, conductive agent and binder into a pellet form to give a negative electrode active material-containing layer, and forming this on the current collector.

3) Positive Electrode

The positive electrode comprises a current collector, and positive electrode active material-containing layer(s) comprising an active material, a conductive agent and a binder (positive electrode material layer[s]) which is/are formed on one surface or both surfaces of the current collector.

As the active material, for example, an oxide, a polymer or the like can be used.

As the oxide, for example, manganese dioxide ($MnO_2$) which is able to absorb lithium, iron oxide, copper oxide and nickel oxide, and lithium-manganese composite oxides (for example, $Li_xMn_2O_4$ or $Li_xMnO_2$), lithium-nickel composite oxides (for example, $Li_xNiO_2$), lithium-cobalt composite oxides (for example, $Li_xCoO_2$), lithium-nickel-cobalt composite oxides (for example, $LiNi_{1-y}Co_yO_2$), lithium-manganese-cobalt composite oxides (for example, $Li_xMn_yCo_{1-y}O_2$), spinel-type lithium-manganese nickel composite oxides ($Li_xMn_{2-y}Ni_yO_4$), lithium phosphorous oxides having an olivine structure (for example, $Li_xFePO_4$, $Li_xFe_{1-y}Mn_yPO_4$, $Li_xCoPO_4$), iron sulfates (for example, $Fe_2(SO_4)_3$), or vanadium oxides (for example, $V_2O_5$) can be used. x and y are preferably $0<x\le1$ and $0\le y\le1$.

As the polymer, for example, conductive polymer materials such as polyaniline and polypyrrole, or disulfide-based polymer materials can be used. Sulfur (S) and carbon fluorides can also be used as the active material.

Preferable active materials may include lithium-manganese composite oxides (for example, $Li_xMn_2O_4$), lithium-nickel composite oxides (for example, $Li_xNiO_2$), lithium-cobalt composite oxides (for example, $Li_xCoO_2$), lithium-nickel-cobalt composite oxides (for example, $Li_xNi_{1-y}Co_yO_2$), spinel-type lithium-manganese-nickel composite oxides (for example, $Li_xMn_{2-y}Ni_yO_4$), lithium-manganese-cobalt composite oxides (for example, $Li_xMn_yCo_{1-y}O_2$) or lithium phosphate irons (for example, $Li_xFePO_4$), which have a high positive electrode voltage, where preferably $0<x\le1$ and $0\le y\le1$.

Further preferable active materials are lithium-cobalt composite oxide or lithium-manganese composite oxide. Since these active materials have high ionic conductivity, the diffusion of the lithium ions in the positive electrode active material is difficult to be a rate-controlling step in combination with the negative electrode active material comprising the active material according to the first embodiment. Therefore, the active material is excellent in compatibility with the negative electrode active material comprising the active material according to the first embodiment.

The conductive agent improves the current collecting performance of the active material and suppress the contact resistance with the current collector. Examples of the conductive agent include carbonaceous materials such as acetylene black, carbon black and graphite.

The binder binds the active material and the conductive agent. Examples of the binder include polytetrafluoroethylene (PTFE), polyvinylidene fluoride (PVdF) and fluorine-based rubbers.

It is preferable to mix the active material, conductive agent and binder in the positive electrode active material-containing layer by the ratios of 80% by mass or more and 95% by mass or less, 3% by mass or more and 18% by mass or less, and 2% by mass or more and 17% by mass or less, respectively. By adjusting the amount of conductive agent to 3% by mass or more, the above-mentioned effects can be exerted. By adjusting the amount of conductive agent to 18% by mass or less, the decomposition of the nonaqueous electrolyte on the surface of the conductive agent under storage at a high temperature can be decreased. By adjusting the amount of binder to 2% by mass or more, a sufficient positive electrode strength can be obtained. By adjusting the amount of binder to 17% by mass or less, the mix amount of binder that is an insulating material in the positive electrode can be decreased and the internal resistance can be decreased.

It is preferable that the current collector is, for example, an aluminum foil, or an aluminum alloy foil comprising an element such as Mg, Ti, Zn, Mn, Fe, Cu and Si.

The positive electrode is prepared by, for example, suspending the active material, conductive agent and binder in a solvent to prepare a slurry, applying the slurry to the current collector and drying, and pressing the current collector. Alternatively, the positive electrode may be prepared by forming the active material, conductive agent and binder into a pellet form to give a positive electrode active material-containing layer, and forming this on the current collector.

4) Nonaqueous Electrolyte

Examples of the nonaqueous electrolyte may include a liquid nonaqueous electrolyte that is prepared by dissolving an electrolyte in an organic solvent, or a gel-like nonaqueous electrolyte obtained by making a composite of a liquid nonaqueous electrolyte and a polymer material.

For the liquid nonaqueous electrolyte, it is preferable that the electrolyte is dissolved in an organic solvent at a concentration of 0.5 M or more and 2.5 M or less.

Examples of the electrolyte include lithium salts such as lithium perchlorate ($LiClO_4$), lithium phosphate hexafluoride ($LiPF_6$), lithium borate tetrafluoride ($LiBF_4$), lithium arsenic hexafluoride ($LiAsF_6$), lithium trifluorometasulfonate (LiCF$_3$SO$_3$) and lithium bistrifluoromethylsulfonylimide [LiN(CF$_3$SO$_2$)$_2$], or mixtures thereof. Electrolytes that are difficult to be oxidized even at a high potential are preferable, and LiPF$_6$ is the most preferable.

Examples of the organic solvent include cyclic carbonates such as propylene carbonate (PC), ethylene carbonate (EC) and vinylene carbonate; chain carbonates such as diethyl carbonate (DEC), dimethyl carbonate (DMC) and methyl ethyl carbonate (MEC); cyclic ethers such as tetrahydrofuran (THF), 2methyltetrahydrofuran (2MeTHF) and dioxolane (DOX); chain ethers such as dimethoxyethane (DME) and diethoxyethane (DEE); or γ-butyrolactone (GBL), acetonitrile (AN) and sulfolane (SL). These organic solvents may be used alone or in the form of a mixed solvent.

Examples of the polymer material include polyvinylidene fluoride (PVdF), polyacrylonitrile (PAN) and polyethylene oxide (PEO).

Preferable organic solvents are mixed solvents obtained by mixing at least two or more among the group consisting of propylene carbonate (PC), ethylene carbonate (EC) and diethyl carbonate (DEC), or mixed solvents comprising γ-butyrolactone (GBL).

5) Separator

Examples of the separator may include porous films comprising polyethylene, polypropylene, cellulose or polyvinylidene fluoride (PVdF), or nonwoven fabrics made of a synthetic resin. Preferable porous films are made of polyethylene or polypropylene, and they can improve safeness since they can be molten at a predetermined temperature to interrupt a current.

Figure 2:
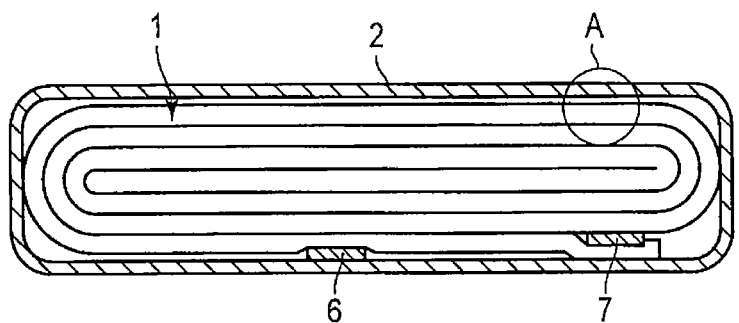
FIG. 2 is a cross-sectional view showing the flat-type nonaqueous electrolyte battery according to the second embodiment.
Figure 3:
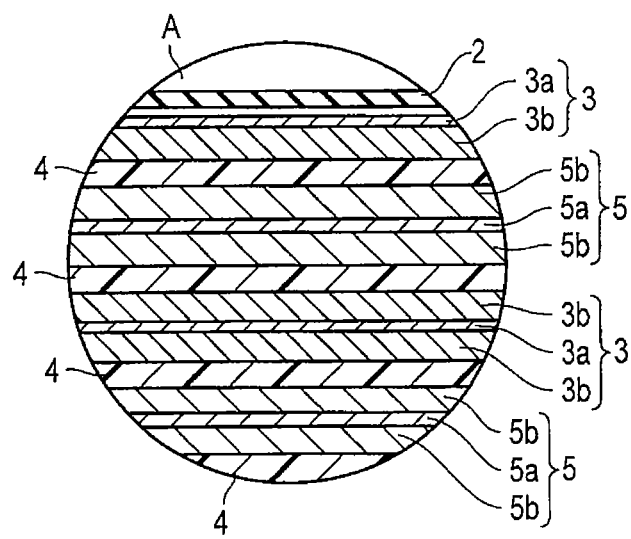
FIG. 3 is an enlarged sectional view of the part A in FIG. 2.

Next, the nonaqueous electrolyte battery according to the embodiment (for example, a flat-type nonaqueous electrolyte battery comprising a case made of a laminate film) will be explained in more detail with reference to FIGS. 2 and 3. FIG. 2 is a cross-sectional view of the flat-type nonaqueous electrolyte battery, and FIG. 3 is an enlarged cross-sectional view of the part A in FIG. 1. Further, each drawing is a schematic view for explaining the embodiment and promoting the understanding thereof, and the shape, size, ratio and the like thereof are different from those of an actual apparatus in some portions, but can be suitably designed or modified by considering the following explanation and known techniques.

A flat wound electrode group 1 is housed in a saclike case 2 constituted by a laminate film comprising two resin layers and an aluminum foil interposed therebetween. The flat wound electrode group 1 is formed by winding a laminate in which a negative electrode 3, a separator 4, a positive electrode 5 and a separator 4 are laminated in this order from the outer side in a spiral shape and subjecting the laminate to press forming. As shown in FIG. 3, the negative electrode 3 on the outermost layer has a constitution in which a negative electrode active material-containing layer 3b is formed on one surface on the inner surface side of a negative electrode current collector 3a. In other negative electrodes 3, the negative electrode active material-containing layers 3b are formed on the both surfaces of the negative electrode current collector 3a. The positive electrode 5 comprises positive electrode active material-containing layers 5b on the both surfaces of a positive electrode current collector 5a.

In the vicinity of the circumferential end of the wound electrode group 1, a negative electrode terminal 6 is electrically connected to the negative electrode current collector 3a of the negative electrode 3 of the outermost layer, and a positive electrode terminal 7 is electrically connected to the positive electrode current collector 5a of the positive electrode 5 on the inner side. These negative electrode terminal 6 and positive electrode terminal 7 are extending outward from the opening of the saclike case 2. For example, a liquid nonaqueous electrolyte is injected from the opening of the saclike case 2. By interposing the negative electrode terminal 6 and positive electrode terminal 7 into the opening of the saclike case 2 and heat-sealing, the wound electrode group 1 and liquid nonaqueous electrolyte are sealed off.

As the negative electrode terminal, for example, a material having electrical stability and conductivity in a potential range of 0.6 V (vs Li/Li$^+$) or more and 3 V (vs Li/Li$^+$) or less can be used. Specific examples may include aluminum, or aluminum alloys comprising an element such as Mg, Ti, Zn, Mn, Fe, Cu or Si. It is preferable that the negative electrode terminal is formed from the same material as that of the negative electrode current collector in order to reduce the contact resistance with the negative electrode current collector.

For the positive electrode terminal, a material having electrical stability and conductivity at a potential in the range of from 3.0 to 5.0 V (vs Li/Li$^+$) can be used. Specific examples may include aluminum, or aluminum alloys comprising an element such as Mg, Ti, Zn, Mn, Fe, Cu or Si. It is preferable that the positive electrode terminal is formed from the same material as that of the positive electrode current collector in order to reduce the contact resistance with the positive electrode current collector.

According to the second embodiment, since the nonaqueous electrolyte battery has a negative electrode comprising the active material according to the first embodiment, a nonaqueous electrolyte battery that is excellent in initial capacity, large-current performances and life performance can be realized.

Third Embodiment

According to the third embodiment, a battery pack comprising a nonaqueous electrolyte battery as a unit cell is provided. The number of the nonaqueous electrolyte battery may be one or plural. In the case when the battery pack comprises a plurality of nonaqueous electrolyte batteries, the batteries are electrically connected in series or parallel.

Next, the battery pack according to the embodiment will be explained with reference to FIGS. 4 and 5. As the unit cell, the flat-type nonaqueous electrolyte battery shown in FIG. 2 is used.

A plurality of unit cells 21 are laminated so that a negative electrode terminal 6 and a positive electrode terminal 7 that are extending outward are aligned in the same direction, and are bound by an adhesive tape 22 to constitute a battery module 23. As shown in FIG. 5, the unit cells 21 are electrically connected in series with one another.

A printed circuit board 24 is disposed opposing to the side surface of the unit cells 21 from which the negative electrode terminal 6 and positive electrode terminal 7 are extended. As shown in FIG. 5, a thermistor 25, a protective circuit 26, and a terminal 27 for carrying a current to an external device are mounted on the printed circuit board 24. In addition, an insulating board (not shown) is attached to the surface of the protective circuit substrate 24, which faces the battery module 23, so as to avoid unnecessary connection with the conductors of the battery module 23.

A positive electrode lead 28 is connected to the positive electrode terminal 7 that is positioned at the lowermost layer of the battery module 23, and the tip thereof is inserted to and electrically connected to a positive electrode connector 29 of the printed circuit board 24. A negative electrode lead 30 is connected to the negative electrode terminal 6 that is positioned at the uppermost layer of the battery module 23, and the tip thereof is inserted to and electrically connected to a negative electrode connector 31 of the printed circuit board 24. These connectors 29 and 31 are connected to a protective circuit 26 via wirings 32 and 33 that are formed on the printed circuit board 24.

The thermistor 25 detects the temperature of the unit cells 21, and the detection signal thereof is sent to the protective circuit 26. The protective circuit 26 may break a positive conductor 34a and a negative conductor 34b between the protective circuit 26 and the terminal 27 for carrying a current to an external device, under a predetermined condition. The predetermined condition refers to, for example, the time at which the detection temperature of the thermistor 25 reaches a predetermined temperature or more. Furthermore, the predetermined condition refers to the time at which over-charge, over-discharge, over-current or the like of the unit cells 21 are detected. The detection of over-charge or the like is performed in the individual unit cells 21 or the battery module 23. When detection is performed in the individual unit cell 21, a battery voltage may be detected, or a positive electrode potential or negative electrode potential may be detected. In the latter case, a lithium electrode that is used as a reference electrode is inserted in the individual unit cell 21. In the case of FIGS. 4 and 5, conductors 35 for detection of a voltage are connected to the respective unit cells 21, and detection signals are sent to the protective circuit 26 via the conductors 35.

Protective sheets 36 made of a rubber or resin are disposed respectively on the three side surfaces of the battery module 23 except for the side surface from which the positive electrode terminal 7 and negative electrode terminal 6 protrude.

The battery module 23 is housed in a housing case 37 together with the respective protective sheets 36 and the printed circuit board 24. Namely, the protective sheets 36 are disposed respectively on the both inner surfaces in the longitudinal side direction and the inner surface in the short side direction of the housing case 37, and the printed circuit board 24 is disposed on the inner surface on the opposite side in the short side direction. The battery module 23 is positioned in a space surrounded by the protective sheets 36 and the printed circuit board 24. A lid 38 is attached to the upper surface of the housing case 37.

Alternatively, the battery module 23 may be fixed by using a heat shrink tape instead of the adhesive tape 22. In this case, the protective sheets are disposed on both side surfaces of the battery module, the battery module is wound around a heat shrink tube, and the heat shrink tube is shrank by heating to bind the battery module.

Although an embodiment in which the unit cells 21 are connected with each other in series is shown in FIGS. 4 and 5, the unit cells may be connected with each other in parallel so as to increase a battery capacity. Alternatively, assembled battery packs may be connected with each other in series or parallel.

Furthermore, the embodiment of the battery pack is suitably changed according to use. Preferable use of the battery pack is one for which cycle performance at high rate is desired. Specific examples may include uses in power sources for digital cameras, and in-car uses in two to four-wheeled hybrid battery automobiles, two to four-wheeled battery automobiles, motor assisted bicycles and the like. In-car uses are preferable.

By using a mixed solvent obtained by mixing at least two or more among the group consisting of propylene carbonate (PC), ethylene carbonate (EC) and diethyl carbonate (DEC), or a nonaqueous electrolyte comprising γ-butyrolactone (GBL), a nonaqueous electrolyte battery having excellent high temperature properties can be obtained. A battery pack comprising a battery module comprising a plurality of such nonaqueous electrolyte batteries is specifically preferable for in-car uses.

According to the third embodiment, since the battery pack comprises the nonaqueous electrolyte battery according to the second embodiment, a battery pack that is excellent in initial capacity, large-current performances and life performance can be realized.

EXAMPLES

Hereinafter the Examples will be explained. However, the embodiments should not be construed to be limited to the Examples described below.

Example 1

Preparation of Monoclinic System β-Type Titanium Composite Oxide

First, potassium molybdate ($K_2MoO_4$), potassium carbonate ($K_2CO_3$) and an anatase-type titanium dioxide ($TiO_2$) were mixed and subjected to a spray drying process to prepare agglomerated particles of fibrous particles, and the particles were calcined at 1,000° C. for 24 hours and washed with pure water to give a proton-exchanged precursor in the form of coagulated particles having an average particle size of about 10 μm ($K_2(Ti,Mo)_4O_9$). The obtained proton-exchanged precursor was put into a 1 M hydrochloric acid solution and stirred under a circumstance at 25° C. for 12 hours to obtain a proton-exchanged form.

The obtained proton-exchanged form was calcined in the air at 350° C. for 3 hours to synthesize a titanium composite oxide. The titanium composite oxide as synthesized was in the form of spherical coagulated particles having an average particle size of 9.6 μm and a specific surface area of 12.8 $m^2/g$.

A wide-angle X-ray diffractometry was conducted for the titanium composite oxide under the following conditions. As the result thereof, an X-ray diffraction pattern shown in FIG. 6 was obtained, and it was confirmed that the titanium composite oxide was a monoclinic system β-type titanium composite oxide having a $TiO_2(B)$ crystal structure that is attributed to JCPDS: 46-1237.

Figure 6:
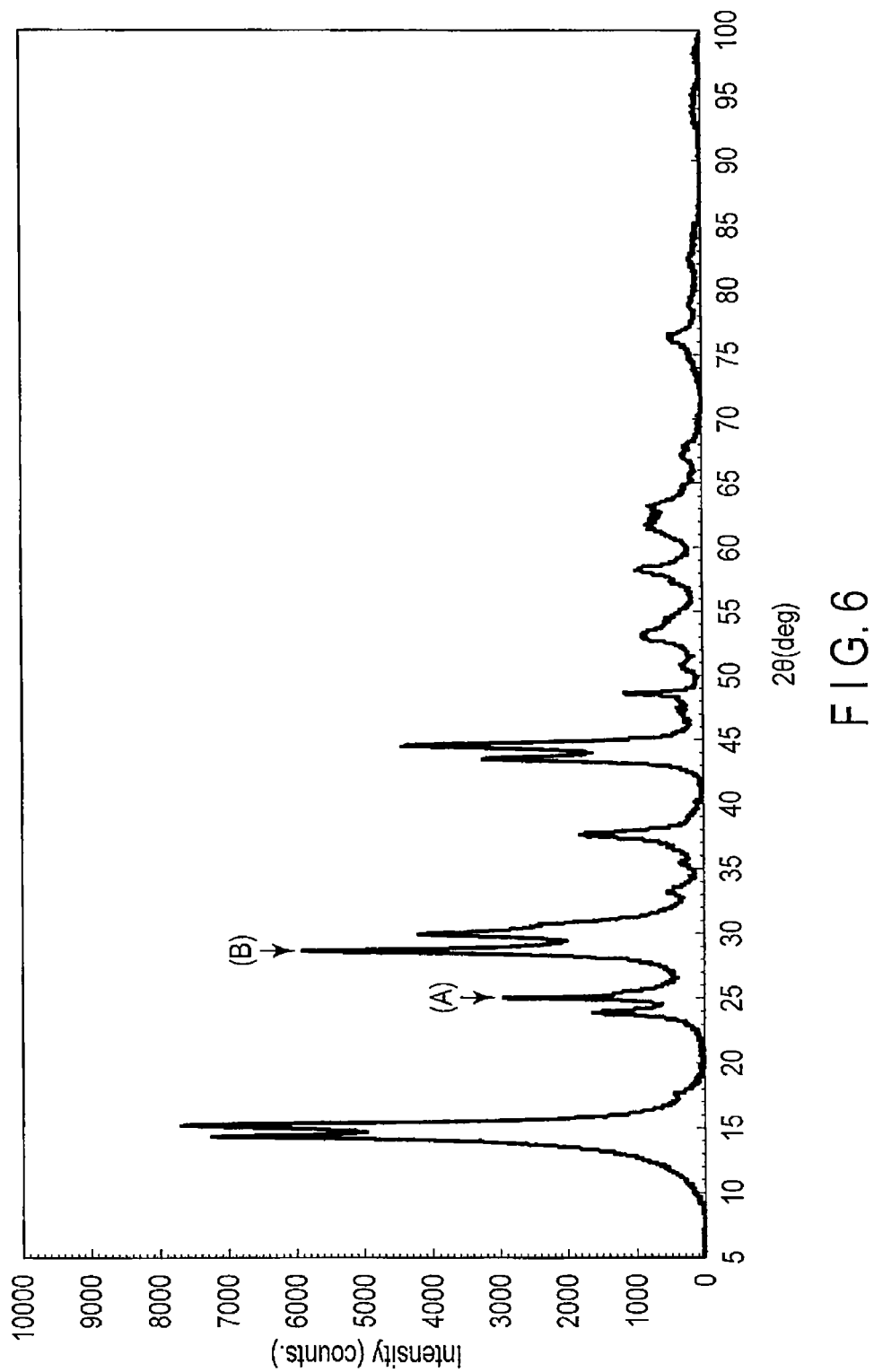
FIG. 6 is a drawing showing the XRD pattern of Example 1.

Furthermore, when the intensity of the peak appeared at 24.989° of the X-ray diffraction pattern shown in FIG. 6 was defined as the intensity A of a peak that is derived from the (110) plane and the intensity of the peak appeared at 28.638° was defined as the intensity B of a peak that is derived from the (002) plane, the relationship of B>A was established.

<Measurement Method>

The sample was filled in a standard glass holder having a diameter of 25 mm, and a measurement was conducted by a wide-angle X-ray diffractometry. The measurement device and conditions are shown below.

(1) X-ray diffractometer: D8 ADVANCE (sealed tube type) manufactured by Bruker AXS
    X-ray source: CuKα ray (using an Ni filter)
    Output: 40 kV, 40 mA
    Slit system: Div. Slit; 0.3°
    Detector: LynxEye (a high-speed detector)
(2) Scanning system: 2θ/θ continuous scan
(3) Measurement range (2θ): 5 to 100°
(4) Step width (2θ): 0.01712°
(5) Counting time: 1 second/step.

The Mo concentration of the obtained titanium composite oxide was measured by an ICP spectrometry method. As the result thereof, it was confirmed that the Mo concentration was 0.2% by mass.

Furthermore, it was confirmed by SEM observation that the obtained titanium composite oxide was spherical particles (secondary particles) formed by agglomeration of fibrous particles (primary particles). In the photographed SEM image, the average fiber diameter of the ten primary particles that had been randomly extracted was 0.5 μm. Furthermore, ratios of fiber length to fiber diameter were calculated for the ten primary particles that had been randomly extracted by the SEM observation, and the average value thereof, 20, was defined as the ratio to be obtained.

<Preparation of Electrode>

90% by mass of the titanium composite oxide powder, 5% by mass of acetylene black as a conductive agent and 5% by mass of polyvinylidene fluoride (PVdF) were added to N-methylpyrrolidone (NMP) and mixed to prepare a slurry. This slurry was applied to the both surfaces of a current collector made of an aluminum foil having a thickness of 15 μm and dried. Thereafter the current collector was pressed to prepare a negative electrode having an electrode density of 2.0 g/cm$^3$.

<Preparation of Liquid Nonaqueous Electrolyte>

Ethylene carbonate (EC) and ethyl methyl carbonate (EMC) were mixed by a volume ratio of 1:2 to give a mixed solvent. 1 M of LiPF$_6$ as an electrolyte was dissolved in this mixed solvent to prepare a liquid nonaqueous electrolyte.

<Production of Beaker Cell>

A beaker cell comprising the prepared electrode as a working electrode and a counter electrode and reference electrode for which metallic lithium were used was prepared, and the above-mentioned liquid nonaqueous electrolyte was poured therein to complete a beaker cell.

Example 2

Preparation of Monoclinic System β-Type Titanium Composite Oxide

A titanium composite oxide was synthesized in a similar manner to Example 1, except that potassium tungstate ($K_2WO_4$), potassium carbonate ($K_2CO_3$) and an anatase-type titanium dioxide ($TiO_2$) were used as raw materials.

A wide-angle X-ray diffractometry was conducted for the titanium composite oxide, and it was confirmed as the result thereof that the titanium composite oxide was a monoclinic system β-type titanium composite oxide having a $TiO_2(B)$ crystal structure that is attributed to JCPDS: 46-1237.

Furthermore, when the intensity of the peak appeared at 24.980° of the X-ray diffraction pattern was defined as the intensity A of a peak that is derived from the (110) plane and the intensity of the peak appeared at 28.631° was defined as the intensity B of a peak that is derived from the (002) plane, the relationship of B>A was established.

The W concentration of the titanium composite oxide was measured by an ICP spectrometry method. As the result thereof, it was confirmed that the W concentration was 0.3% by mass.

Furthermore, it was confirmed by SEM observation that the titanium composite oxide was spherical particles (secondary particles) formed by agglomeration of fibrous particles (primary particles). In the photographed SEM image, the average fiber diameter of the ten primary particles that had been randomly extracted was 0.5 μm. Furthermore, the ratio of fiber length to fiber diameter was obtained in a similar manner to Example 1 and found to be 20.

Examples 3 to 10 and Comparative Example 1

A titanium composite oxide was synthesized in a similar manner to Example 1, except that the mix ratio of potassium molybdate ($K_2MoO_4$) or potassium tungstate ($K_2WO_4$) as a raw material was changed. A wide-angle X-ray diffractometry was conducted for the titanium composite oxide, and it was confirmed as the result thereof that the titanium composite oxide was a monoclinic system β-type titanium composite oxide having a $TiO_2(B)$ crystal structure that is attributed to JCPDS: 46-1237. Furthermore, the relationship of B>A was established for the X-ray diffraction patterns of Examples 3 to 10.

The addition concentration of the titanium composite oxide was measured by an ICP spectrometry method. The result is shown in Table 1.

Furthermore, it was confirmed by SEM observation that the titanium composite oxide was spherical particles (secondary particles) formed by agglomeration of fibrous particles (primary particles). In the photographed SEM image, the average fiber diameter of the ten primary particles that had been randomly extracted was 0.5 μm. Furthermore, the ratio of fiber length to fiber diameter was obtained in a similar manner to Example 1 and found to be 20.

Examples 11 to 13

A titanium composite oxide was synthesized in a similar manner to Example 1, except that potassium tungstate ($K_2WO_4$), niobium oxide ($Nb_2O_5$), potassium carbonate ($K_2CO_3$) and an anatase-type titanium dioxide ($TiO_2$) were used as raw materials.

A wide-angle X-ray diffractometry was conducted for the titanium composite oxide, and it was confirmed as the result thereof that the titanium composite oxide was a monoclinic system β-type titanium composite oxide having a $TiO_2(B)$ crystal structure that is attributed to JCPDS: 46-1237. Furthermore, the relationship of B>A was established for the X-ray diffraction pattern.

The additional element concentration of the titanium composite oxide was measured by an ICP spectrometry method. The result is shown in Table 1.

Furthermore, it was confirmed by SEM observation that the titanium composite oxide was spherical particles (secondary particles) formed by agglomeration of fibrous particles (primary particles). In the photographed SEM image, the average fiber diameter of the ten primary particles that had been randomly extracted was 0.5 μm. The aspect ratio (fiber length/fiber diameter) was measured in a similar manner to Example 1 and found to be 15 in Example 11 and 10 in Example 12 and Example 13.

Examples 14 and 15

A titanium composite oxide was synthesized in a similar manner to Example 12, except that vanadium oxide ($V_2O_5$) or tantalum oxide ($Ta_2O_5$) was used instead of niobium oxide ($Nb_2O_5$) as a raw material.

A wide-angle X-ray diffractometry was conducted for the titanium composite oxide, and it was confirmed as the result thereof that the titanium composite oxide was a monoclinic system β-type titanium composite oxide having a $TiO_2(B)$ crystal structure that is attributed to JCPDS: 46-1237. Furthermore, the relationship of B>A was established for the X-ray diffraction pattern.

The additional element concentration of the titanium composite oxide was measured by an ICP spectrometry method. The result is shown in Table 1.

Furthermore, it was confirmed by SEM observation that the titanium composite oxide was spherical particles (secondary particles) formed by agglomeration of fibrous particles (primary particles). In the photographed SEM image, the average fiber diameter of the ten primary particles that had been randomly extracted was 0.5 µm. The aspect ratio (fiber length/fiber diameter) was measured in a similar manner to Example 1 and found to be 10 in both Examples.

Comparative Example 2

Preparation of Titanium Composite Oxide

First, molybdenum oxide ($MoO_2$), potassium carbonate ($K_2CO_3$) and an anatase-type titanium dioxide ($TiO_2$) were mixed and subjected to a spray drying process to prepare coagulated particles, and the particles were calcined at 800° C. for 24 hours and washed with pure water to give a proton-exchanged precursor in the form of coagulated particles having an average particle size of about 10 µm ($K_2(Ti,Mo)_4O_9$). The obtained proton-exchanged precursor was put into a 1 M hydrochloric acid solution and stirred under a circumstance at 25° C. for 12 hours to give a proton-exchanged form.

The obtained proton-exchanged form was calcined in the air at 350° C. for 3 hours to synthesize a titanium composite oxide. A wide-angle X-ray diffractometry was conducted for the titanium composite oxide under similar conditions to those of Example 1. As the result thereof, the X-ray diffraction pattern shown in FIG. 7 was obtained, and it was confirmed that the titanium composite oxide was a monoclinic system β-type titanium composite oxide having a $TiO_2(B)$ crystal structure that is attributed to JCPDS: 46-1237.

Figure 7:
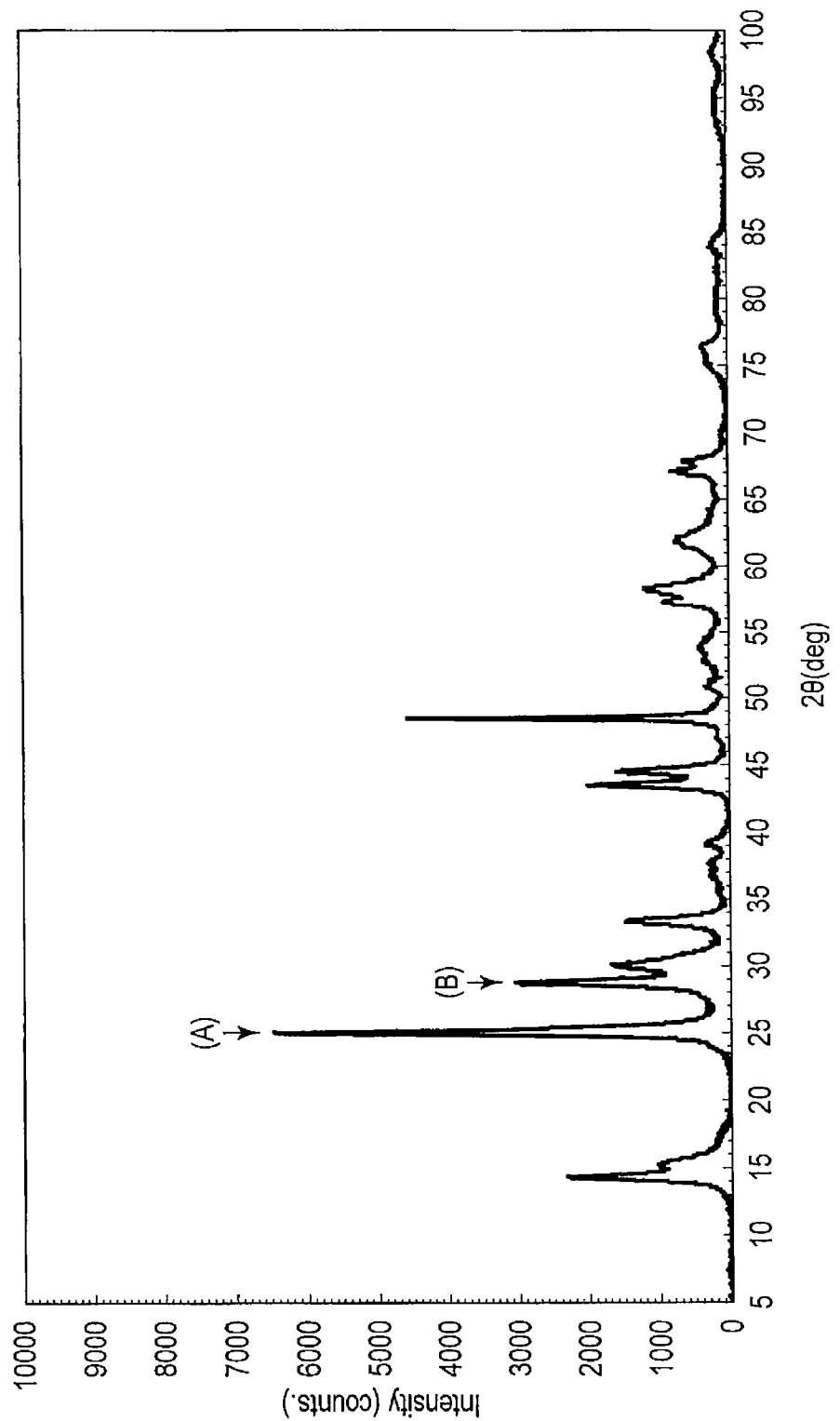
FIG. 7 is a drawing showing the XRD pattern of Comparative Example 2.

Furthermore, when the intensity of the peak appeared at 24.980° of the X-ray diffraction pattern shown in FIG. 7 was defined as the intensity A of a peak that is derived from the (110) plane and the intensity of the peak appeared at 28.631° was defined as the intensity B of a peak that is derived from the (002) plane, the relationship of B<A was established.

The additional element concentration of the titanium composite oxide was measured by an ICP spectrometry method. The result is shown in Table 1.

A similar beaker cell to that in Comparative Example 1 was prepared by using the obtained titanium composite oxide, and a similar charge and discharge cycle test was conducted. The result is shown in Table 1.

Comparative Example 3

A titanium composite oxide was synthesized in a similar manner to Comparative Example 2 except that tungsten oxide ($WO_3$) was used instead of molybdenum oxide ($MoO_2$). When a wide-angle X-ray diffractometry was conducted for the obtained titanium composite oxide, a similar X-ray diffraction pattern to that of FIG. 7 was obtained, and it was confirmed that the titanium composite oxide was a monoclinic system β-type titanium composite oxide having a $TiO_2(B)$ crystal structure that is attributed to JCPDS: 46-1237. Similarly to Comparative Example 2, the peak intensities in Comparative Example 3 were B<A.

The additional element concentration of the obtained titanium composite oxide was measured by an ICP spectrometry method. The result is shown in Table 1.

A similar beaker cell to that in Comparative Example 1 was prepared by using the obtained titanium composite oxide, and a similar charge and discharge cycle test was conducted. The result is shown in Table 1.

For each of the obtained beaker cells of Examples and Comparative Examples, a charge and discharge cycle test in which charging and discharging by 1 C charging at a charging voltage of 3 V/1 C discharging at a discharging voltage of 1 V are repeated 100 times was conducted under a circumstance at 45° C. The ratio of the discharge capacity at the 100th to the initial discharge capacity, i.e., capacity retention (%), is shown in the following Table 1.

TABLE 1

| | Relationship of peak intensities | Content of first element [% by mass] | Content of second element [% by mass] | Capacity retention [%] |
|---|---|---|---|---|
| Example 1 | B > A | Mo(0.2) | — | 78 |
| Example 2 | B > A | W(0.3) | — | 76 |
| Comparative Example 1 | B < A | — | — | 24 |
| Comparative Example 2 | B < A | Mo(0.3) | — | <20 |
| Comparative Example 3 | B < A | W(0.3) | — | <20 |
| Example 3 | B > A | Mo(0.03) | — | 56 |
| Example 4 | B > A | Mo(1.0) | — | 78 |
| Example 5 | B > A | Mo(3.0) | — | 80 |
| Example 6 | B > A | Mo(6.0) | — | 44 |
| Example 7 | B > A | W(0.03) | — | 52 |
| Example 8 | B > A | W(1.0) | — | 74 |
| Example 9 | B > A | W(3.0) | — | 76 |
| Example 10 | B > A | W(6.0) | — | 40 |
| Example 11 | B > A | Mo(0.2) | Nb(0.3) | 84 |
| Example 12 | B > A | Mo(0.2) | Nb(3.0) | 90 |
| Example 13 | B > A | Mo(0.2) | Nb(6.0) | 88 |
| Example 14 | B > A | Mo(0.2) | V(3.0) | 84 |
| Example 15 | B > A | Mo(0.2) | Ta(3.0) | 82 |

It is understood from the comparison between Examples 1 to 2 and Comparative Examples 1 to 3 in Table 1 that the secondary batteries of Examples 1 to 2 have excellent charge and discharge cycle performances as compared to the secondary batteries of Comparative Examples 1 to 3. When B<A, even if the first element is contained as in Comparative Examples 2 and 3, the capacity retention during the charge and discharge cycles is lower than that in Comparative Example 1 in which a titanium composite oxide being free from the first element and having peak intensities of B<A is used. It was found that, when the peak intensities are B<A, the capacity retention during the charge and discharge cycles is not improved even if the first element is added. Unlike $K_2MoO_4$ and $K_2WO_4$, the molybdenum oxide being free from K that was used in Comparative Example 2 and the tungsten oxide being free from K that was used in Comparative Example 3 are difficult to act as a flux. Furthermore, in Comparative Examples 2 and 3, the calcination temperature (heat treatment temperature) is 800° C. that is less than 900° C. It is presumed that fibers in which crystals had grown could not be obtained and the peak intensities had the relationship B<A since the syntheses in Comparative Examples 2 and 3 were based on a solid phase reaction.

Furthermore, it is understood from the comparison between Example 1 and Examples 3 to 6 that, when Mo is used as the first element, the capacity retention in Examples 1 and 3 to 5 in which the Mo content is from 0.01 to 3% by mass are higher than that in Example 6 in which the Mo content exceeds 3% by mass.

It is understood from the comparison between Example 2 and Examples 7 to 10 that, when W is used as the first element, the capacity retentions in Examples 2 and 7 to 9 in which the W content is from 0.01 to 3% by mass are higher than that in Example 10 in which the W content exceeds 3% by mass.

Furthermore, it is understood from the comparison between Example 1 and Examples 11 to 15 that the cells have further excellent charge and discharge cycle performances by comprising the second element as in Examples 11 to 15.

Comparative Examples 4 and 5

Titanium composite oxides were synthesized in similar manners to Example 1 and Comparative Example 1, except that the heat treatment temperature of the proton-exchanged form was 700° C. for 3 hours. An X-ray diffractometry was conducted for the obtained titanium composite oxides, and it was confirmed as the result thereof that both titanium composite oxides were anatase type titanium composite oxides.

Comparative Examples 6 and 7

Titanium composite oxides were synthesized in similar manners to Example 1 and Comparative Example 1, except that the heat treatment temperature of the proton-exchanged form was 1,000° C. for 3 hours. An X-ray diffractometry was conducted for the obtained titanium composite oxides, and it was confirmed as the result thereof that both titanium composite oxides were rutile type titanium composite oxides.

For each of the batteries of Comparative Examples 4 to 7, a charge and discharge cycle test in which 1 C charging at a charging voltage of 3 V/1 C discharging at a discharging voltage of 1 V were repeated was conducted under a circumstance at 45° C. The results thereof are shown in the following Table 2. In both of Comparative Examples 6 and 7 that were rutile types, a capacity was not obtained at the initial charging (charging was impossible). Furthermore, although Comparative Examples 4 and 5 that were anatase types could be charged and discharged at the first time, the capacity became almost zero after ten times of charging and discharging, and the capacity after 100 times was zero. As shown in Comparative Examples 4 to 7, an effect of improving charge and discharge cycle performances could not be obtained in the titanium composite oxides other than the monoclinic system p-type.

TABLE 2

| | Content of first element [% by mass] | Content of second element [% by mass] | Capacity retention [%] |
|---|---|---|---|
| Comparative Example 4 | Mo(0.2) | — | 0 |
| Comparative Example 5 | — | — | 0 |
| Comparative Example 6 | Mo(0.2) | — | Charging was impossible |
| Comparative Example 7 | — | — | Charging was impossible |

According to the active material of at least one embodiment mentioned above, since the active material comprises a monoclinic system β-type titanium composite oxide that comprises a first element comprising at least one of Mo and W and satisfies the formula (1), the life performance can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising:
   a monoclinic system β-type titanium composite oxide which comprises a first element comprising at least one of Mo and W and satisfies the following formula (1):

$$B > A \quad (1)$$

wherein A is an intensity of a peak which is derived from (110) plane of the monoclinic system β-type titanium composite oxide in a wide-angle X-ray diffraction pattern, and B is an intensity of a peak which is derived from (002) plane of the monoclinic system β-type titanium composite oxide in the wide-angle X-ray diffraction pattern.

2. The active material according to claim 1, wherein the monoclinic system β-type titanium composite oxide comprises a second element comprising at least one selected from the group consisting of V, Nb and Ta.

3. The active material according to claim 2, wherein a content of the second element in the monoclinic system β-type titanium composite oxide is in the range of 0.01 to 10% by mass.

4. The active material according to claim 2, wherein the monoclinic system β-type titanium composite oxide comprises a solid solution of the second element and Ti.

5. The active material according to claim 2, wherein the monoclinic system β-type titanium composite oxide has an agglomerated particle of fibrous particles containing the first element by a content of 0.01 to 3% by mass and the second element by a content of 0.01 to 10% by mass.

6. The active material according to claim 1, wherein a content of the first element in the monoclinic system β-type titanium composite oxide is in the range of 0.01 to 3% by mass.

7. The active material according to claim 1, wherein a content of the first element in the monoclinic system β-type titanium composite oxide is in the range of 0.1 to 1% by mass.

8. The active material according to claim 1, wherein the monoclinic system β-type titanium composite oxide has a coagulated form of fibrous particles, and the fibrous particles have an average fiber diameter of 1 nm or more and 10 μm or less and a ratio of fiber length to fiber diameter of 20 or less.

9. The active material according to claim 1, wherein the monoclinic system β-type titanium composite oxide has a crystal structure represented by $TiO_2(B)$.

10. The active material according to claim 1, wherein the monoclinic system β-type titanium composite oxide comprises a solid solution of the first element and Ti.

11. A nonaqueous electrolyte battery comprising:
    a positive electrode,
    a negative electrode comprising the active material according to claim 1, and
    a nonaqueous electrolyte.

12. A battery pack comprising the nonaqueous electrolyte battery according to claim 11.

13. The battery pack according to claim 12, further comprising:
    a protection circuit which is capable of detecting a voltage of the nonaqueous electrolyte battery.

* * * * *